Oct. 20, 1931.   O. J. GROEHN   1,827,743
METAL AUTOMOBILE BODY
Filed Feb. 3, 1928
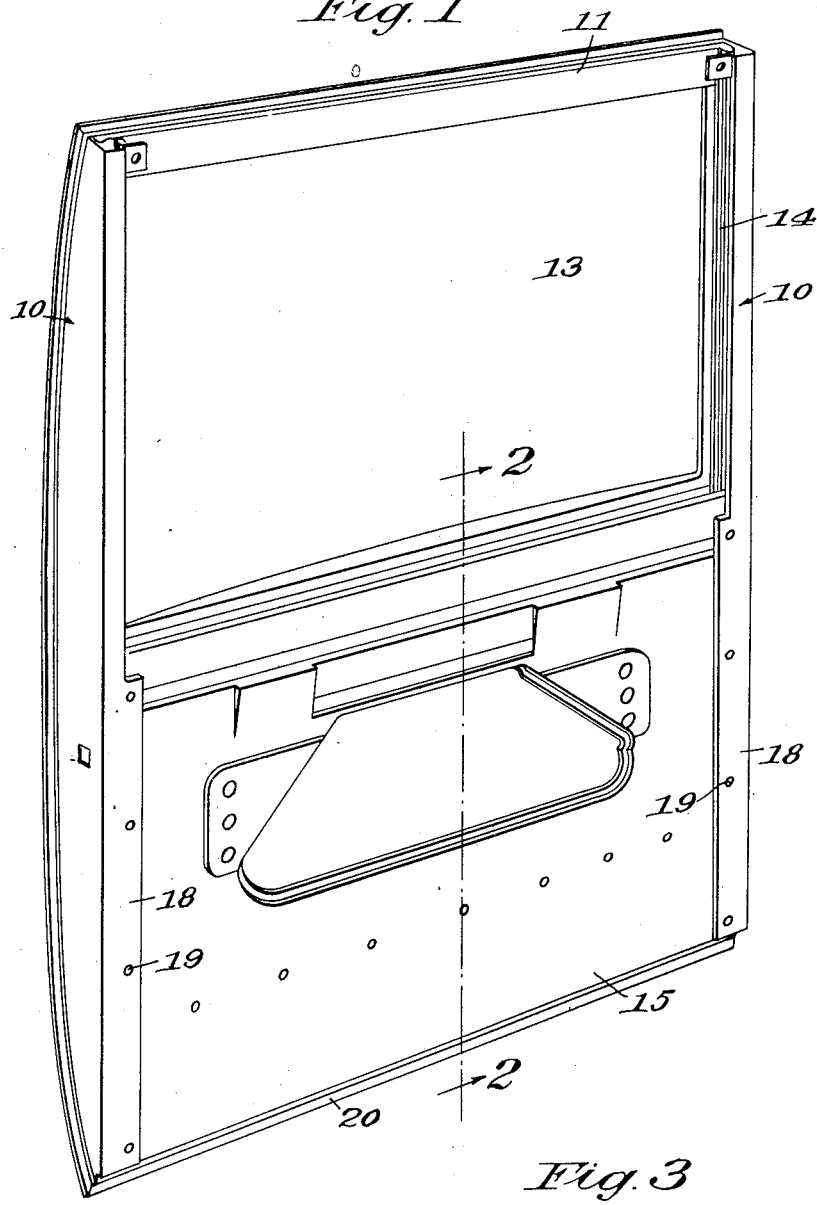
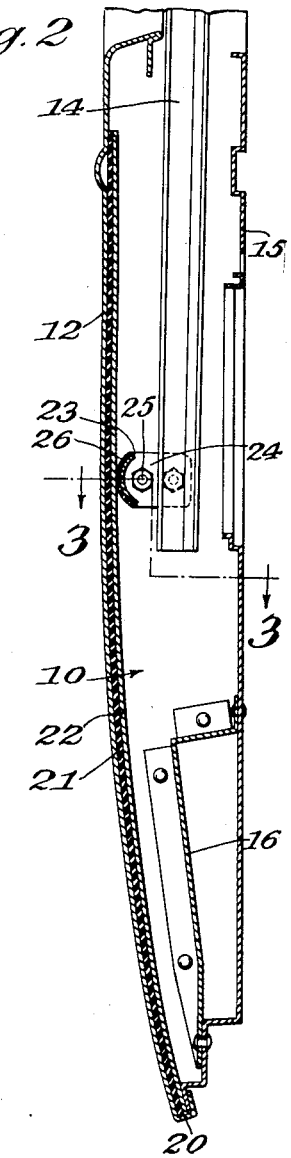
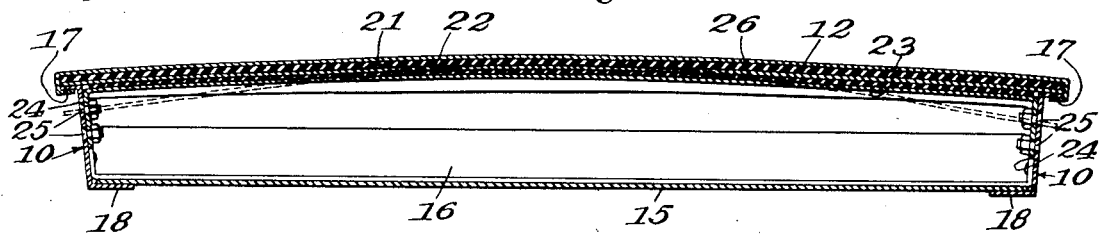

Patented Oct. 20, 1931

1,827,743

UNITED STATES PATENT OFFICE

OTTO J. GROEHN, OF GROSSE POINTE PARK, MICHIGAN, ASSIGNOR TO HUDSON MOTOR CAR COMPANY, OF DETROIT, MICHIGAN, A CORPORATION OF MICHIGAN

METAL AUTOMOBILE BODY

Application filed February 3, 1928. Serial No. 251,668.

All-metal automobile bodies, such as are now quite extensively used, while having distinct advantages from the standpoint of strength, durability, and economy of production over the older types of wooden and composite bodies, have been found to be objectionably noisy in use, due, in part at least, to the resonance of the exterior paneling which is usually curved in configuration corresponding with the desired curved lines of the body. This trouble, while present to a certain extent throughout the body, is particularly noticeable in the case of the doors which, when closed suddenly, give forth an offensive metallic ring.

This invention has for its object to provide simple means for overcoming the foregoing objections of such character as to be readily applicable to bodies of existing design without complicating or requiring material changes in the latter and without substantially increasing the cost of production. To this end the invention in its broader aspect consists in applying a non-metallic backing to the sheet metal panels to deaden their resonance and thereby prevent the metallic noises characteristic of bodies of this character. In its preferred form the invention consists in the employment of a sheet of non-metallic material overlying the inner face of the outer panel, together with means for holding said sheet in engagement with the panel substantially throughout its area.

The foregoing and other objects of the invention, together with means whereby the latter may be carried into effect, will best be understood from the following description of one form or embodiment thereof illustrated in the accompanying drawings. It will be understood, however, that the particular construction described and shown has been chosen for purposes of exemplification merely, and that said invention, as defined by the claims hereunto appended, may be otherwise embodied without departure from the spirit and scope thereof.

In said drawings,

Fig. 1 is a perspective view, looking from the inner side, of a metal door for a closed automobile body, the window operating mechanism and the trim being omitted.

Fig. 2 is an enlarged vertical section taken substantially on line 2—2, Fig. 1.

Fig. 3 is a horizontal section taken substantially on the line 3—3, Fig. 2.

The invention is herein shown as embodied in an automobile door comprising a pair of pillars 10 connected at their upper ends by a header 11, an outer sheet metal panel 12 having a window opening 13 at the sides of which window guides 14 are carried by the pillars, an inner panel 15, which carries the window regulating mechanism and the interior trim (not shown), and a suitable reinforcing member or members 16. The pillars 10, as shown, are Z-shaped in cross section, having outer flanges 17 to which the vertical edges of the outer panel 12 are secured, as by being crimped thereover, and inner flanges 18 to which the vertical edges of the inner panel 15 are secured, as by rivets 19, the lower edge of the panel 12 being also crimped over or otherwise secured to the lower edge of the panel 15, as shown at 20.

In accordance with the present invention, the outer panel 12 is provided with a non-metallic backing layer herein shown as a sheet 21 of non-metallic material, such as heavy cardboard, fiber board, felt, or the like, said sheet overlying the inner face of the panel and being in engagement with the latter substantially throughout its area. Preferably the vertical edges of the sheet 21 are interposed between the edges of the panel 12 and the pillar flanges 17, while its lower edge is interposed between the lower edges of the panels 12 and 15 at the joint 20.

Various means, such as adhesive, etc., may be employed for holding the sheet 21 in engagement with the inner face of the panel 12, but as herein shown there is provided an interior panel 22, preferably of thin sheet steel or other resilient metal, said panel 22 being substantially co-extensive in area with the sheet 21, and having its edges likewise interposed between the panel 12, on the one end, and the pillar flanges 17 and panel 15 respectively, on the other. The panel 22 is preferably formed with a normal curvature greater than that of the outer panel 12, as indicated in dotted lines in Fig. 3, so that when the edges of said interior panel are secured to the edges of the outer panel with the sheet 21 interposed between said panels, said interior panel will be placed under a permanent strain tending to press the sheet 21 against the inner face of the panel 12 throughout its area.

From the foregoing it will be seen that the pillars of the door, or other part of the body structure, are joined by means of a pair of metal sheets each of which is pre-formed, or stamped previous to assembly, to have a permanent curvature. The two sheets are however formed with different curvatures so that when the adjacent side edges are joined together the sheets will be pressed together and held under tension, with the non-metallic material 21 clamped therebetween.

If desired, and as herein shown, a strainer 23 may be employed in lieu of or in conjunction with the interior panel 22, said strainer comprising a horizontally disposed laterally curved, resilient bar having angular ends 24 secured, as by bolts or rivets 25, to the webs of the pillars 10. When used in conjunction with the interior metal panel 22, the strainer 23, which is preferably of metal, is provided with a non-metallic facing 26 bearing against said panel.

It has been found in practice that by providing an exterior door or body panel 12 with a non-metallic backing, such as that afforded by the sheet 21, the metallic resonance of said panel is effectually deadened and, in the case of a door, that the sound produced in closing the same is very similar to that produced in closing a wooden door of the older types. It will be seen that the expedient described is a simple one, readily applicable to body structures of existing design without material change of the later and at a negligible cost.

Having thus described my invention, I claim:

1. In an automobile body, an outer sheet metal panel shaped to have a permanent outward curvature, and an inner outwardly curved panel of non-metallic sheet material substantially co-extensive in area with the outer panel supported under tension to exert resilient pressure against said outer panel.

2. In an automobile body, an outer sheet metal panel shaped to have a permanent outward curvature, and silencing means for said outer panel including a sheet of material supported under its own tension for pressing against said outer panel.

3. In an automobile body, an outer sheet metal panel shaped to have permanent outward curvature, an inner outwardly curved panel of sheet material supported under tension to exert resilient pressure against said outer panel and a sheet of non-metallic material interposed between said panels, said sheet being substantially co-extensive in area with said outer and inner panels.

4. In an automobile body, an outer sheet metal panel shaped to have a permanent outward curvature, an inner outwardly curved panel of sheet material supported under tension to exert resilient pressure against said outer panel, and silencing means for said panels including a sheet of material supported under its own tension interposed between said panels.

5. In an automobile body, a pair of upright pillars, an outer sheet metal panel mounted on said pillars shaped to have a permanent outward curvature, and silencing means for said outer panel including a sheet of material also mounted on said pillars outwardly curved under its own tension to exert pressure against said outer panel.

In testimony whereof I affix my signature.

OTTO J. GROEHN.